(12) United States Patent
Abe et al.

(10) Patent No.: US 7,186,329 B2
(45) Date of Patent: Mar. 6, 2007

(54) HIGH-MACROPORE HYDROPROCESSING CATALYST AND ITS USE

(75) Inventors: Satoshi Abe, Saijo (JP); Akira Hino, Niihama (JP); Masafumi Shimowake, Niihama (JP); Katsuhisa Fujita, Niihama (JP)

(73) Assignee: Nippon Ketjen Co., Ltd., Tokyo (JP)

( * ) Notice: Subject to any disclaimer, the term of this patent is extended or adjusted under 35 U.S.C. 154(b) by 5 days.

(21) Appl. No.: 10/480,066

(22) PCT Filed: Jun. 10, 2002

(86) PCT No.: PCT/EP02/06666

§ 371 (c)(1), (2), (4) Date: Jul. 7, 2004

(87) PCT Pub. No.: WO02/100541

PCT Pub. Date: Dec. 19, 2002

(65) Prior Publication Data

US 2004/0238411 A1 Dec. 2, 2004

(30) Foreign Application Priority Data

Jun. 8, 2001 (JP) ............................. 2001-174071

(51) Int. Cl.
- B01J 23/00 (2006.01)
- C01G 45/04 (2006.01)
- C01G 47/00 (2006.01)

(52) U.S. Cl. ............................... 208/216 PP; 502/313; 208/217; 208/251 H; 208/254 H; 208/111.3; 208/111.35

(58) Field of Classification Search ................ 502/327, 502/332–339, 415, 355, 439, 313–316; 208/216 PP, 208/217, 251 H, 254 H, 111.3, 111.35
See application file for complete search history.

(56) References Cited

U.S. PATENT DOCUMENTS

| | | | |
|---|---|---|---|
| 3,898,155 A | 8/1975 | Wilson | 208/216 |
| 4,016,108 A * | 4/1977 | Robson | 502/322 |
| 4,066,574 A * | 1/1978 | Tamm | 502/220 |
| 4,081,406 A | 3/1978 | Sawyer | 252/455 |
| 4,181,602 A * | 1/1980 | Quick et al. | 208/216 PP |
| 4,271,042 A * | 6/1981 | Oleck et al. | 502/314 |
| 4,284,531 A * | 8/1981 | Simpson et al. | 502/74 |
| 4,306,965 A * | 12/1981 | Hensley, Jr. et al. | 208/216 PP |
| 4,326,995 A * | 4/1982 | Berg et al. | 502/314 |
| 4,341,625 A * | 7/1982 | Tamm | 208/216 PP |
| 4,388,222 A | 6/1983 | Wilson et al. | 252/437 |
| 4,395,329 A * | 7/1983 | Le Page et al. | 208/251 H |
| 4,414,141 A | 11/1983 | Schindler | 502/314 |
| 4,456,700 A * | 6/1984 | Oleck et al. | 502/220 |
| 4,456,701 A * | 6/1984 | Chen | 502/221 |
| 4,460,707 A * | 7/1984 | Simpson | 502/315 |
| 4,465,789 A * | 8/1984 | Lindsley | 502/255 |
| 4,551,443 A * | 11/1985 | Hudson | 502/313 |
| 4,600,703 A * | 7/1986 | Morales et al. | 502/210 |
| 4,642,179 A * | 2/1987 | Morales et al. | 208/217 |
| 4,657,663 A * | 4/1987 | Gardner et al. | 208/210 |
| 4,707,466 A * | 11/1987 | Beaton et al. | 502/313 |
| 4,732,886 A * | 3/1988 | Tomino et al. | 502/314 |
| 4,846,961 A * | 7/1989 | Robinson et al. | 208/216 PP |
| 4,880,523 A | 11/1989 | Kemp | 208/216 |
| 4,886,582 A * | 12/1989 | Simpson | 502/211 |
| 4,895,816 A * | 1/1990 | Gardner et al. | 502/10 |
| 4,945,079 A * | 7/1990 | Pedersen et al. | 502/314 |
| 5,009,771 A * | 4/1991 | Clark et al. | 208/216 PP |
| 5,094,994 A * | 3/1992 | Sherwood et al. | 502/314 |
| 5,100,855 A * | 3/1992 | Clark et al. | 502/211 |
| 5,192,734 A * | 3/1993 | Creighton et al. | 502/314 |
| 5,215,955 A * | 6/1993 | Threlkel | 502/221 |
| 5,223,472 A * | 6/1993 | Simpson et al. | 502/314 |
| 5,244,858 A * | 9/1993 | Usui et al. | 502/220 |
| 5,322,829 A | 6/1994 | Artes et al. | 502/254 |
| 5,332,490 A * | 7/1994 | Taylor et al. | 208/111.3 |
| 5,389,595 A * | 2/1995 | Simpson et al. | 502/315 |
| 5,403,806 A * | 4/1995 | Simpson | 502/211 |
| 5,416,054 A * | 5/1995 | Dai et al. | 502/211 |
| 5,435,908 A | 7/1995 | Nelson et al. | 208/216 |
| 5,436,215 A * | 7/1995 | Dai et al. | 502/317 |
| 5,453,411 A * | 9/1995 | Dai et al. | 502/315 |
| 5,498,586 A * | 3/1996 | Dai et al. | 502/313 |
| 5,545,602 A | 8/1996 | Nelson et al. | 502/314 |
| 5,616,530 A * | 4/1997 | Sherwood et al. | 502/210 |

(Continued)

FOREIGN PATENT DOCUMENTS

CA          1248513          1/1989

OTHER PUBLICATIONS

Van Kervoort, et al., J. Inst. Pet., 37, *Determination of Dry-sludge Content of Fuel Oil: Development of the Shell Hot Filtration Test (SHFT)*, pp. 596-604 (1951).

International Search Report of PCT/EP02/06666, dated Nov. 7, 2002.

*Primary Examiner*—Cam N. Nguyen
(74) *Attorney, Agent, or Firm*—Frank C. Eymard

(57) ABSTRACT

The present invention pertains to a catalyst comprising 7–20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. The catalyst has a specific surface area of 100–180 m$^2$/g, a total pore volume of at least 0.55 ml/g, at least 50% of the total pore volume in pores with a diameter of at least 20 nm (200 Å), 10–30% of the total pore volume in pores with a diameter of at least 200 nm (2000 Å), and 0–1% of the total pore volume in pores with a diameter above 1000 nm (10000 Å). The catalyst is particularly suitable for the hydroprocessing of heavy hydrocarbon feeds of which at least 50 wt. % boils above 538° C. (1000° F.). It is especially advantageous for the hydroprocessing of feedstocks of which at least 80 wt. % boils above 538° C. (1000° F.).

9 Claims, No Drawings

U.S. PATENT DOCUMENTS

| | | | |
|---|---|---|---|
| 5,620,592 A | * 4/1997 | Threlkel | 208/216 PP |
| 5,827,421 A | 10/1998 | Sherwood, Jr. | 208/112 |
| 5,888,380 A | * 3/1999 | Fujita et al. | 208/251 H |
| 5,914,290 A | * 6/1999 | Shi et al. | 502/228 |
| 6,332,976 B1 | * 12/2001 | Mignard et al. | 208/217 |
| 6,387,248 B2 | * 5/2002 | Sherwood et al. | 208/216 PP |

* cited by examiner

HIGH-MACROPORE HYDROPROCESSING CATALYST AND ITS USE

CROSS REFERENCE TO RELATED APPLICATIONS

This application is based on Japanese priority Patent Application No. 2001-174071, filed Jun. 8, 2001, and PCT Application No. PCT/EP02/06666, filed Jun. 10, 2002.

BACKGROUND OF THE INVENTION

1. Field of the Invention

The present invention relates to a hydroprocessing catalyst and its use in the hydroprocessing of heavy hydrocarbon oils.

2. Prior Art

The present invention relates to a catalyst suitable for the hydroprocessing of heavy hydrocarbon oils, in particular hydrocarbon oils containing relatively large amounts of vacuum residue fraction. These oils contain a large amount of impurities such as sulfur, Conradson carbon residue (CCR), metals, nitrogen, and asphaltene, and it is needed to effect hydrodesulfurisation (HDS), carbon residue reduction (HDCCR), hydrodemetallisation (HDM), hydrodenitrification (HDN), asphaltene reduction (HDAsp) and/or conversion into lighter products. The present invention also relates to a process for hydroprocessing heavy hydrocarbon oils, in particular feeds containing substantial amounts of vacuum residue using said catalyst.

Hydrocarbon oils containing 50 wt % or more of components with a boiling point of 538° C. or higher are called heavy hydrocarbon oils. These include atmospheric residue (AR), of which at least 50 wt. % boils above 538° C., and vacuum residue (VR), of which at least 90% boils above 538° C. It is desired to remove impurities such as sulfur from these heavy hydrocarbon oils by hydroprocessing, and to convert them into lighter oils, which have a higher economic value.

Various catalysts have been proposed for this purpose in the art. Generally, these catalysts are capable of efficiently removing sulfur, Conradson carbon residue (CCR), various metals, nitrogen and/or asphaltenes. However, it was found that the decomposition of asphaltenes is generally accompanied by the formation of sediment and sludge. Sediment can be determined by the Shell hot filtration solid test (SHFST). (see Van Kerknoort et al., *J. Inst. Pet.*, 37, p. 596 604 (1951)). Its ordinary content is said to be about 0.19 to 1 wt. % in product with a boiling point of 340° C. or higher collected from the bottom of a flash drum.

Sediment formed during hydroprocessing may settle and deposit in such apparatuses as heat exchangers and reactors, and because it threatens to close off the passage, it may seriously hamper the operation of these apparatuses.

The formation of sediment is a particular problem in the hydroprocessing of feeds containing a relatively large amount of vacuum residue fraction. There is therefore need for a hydroprocessing catalyst which is particularly suitable for removal of sulfur, metals, and Conradson carbon from these feedstocks, which generally have at least 80 wt. % boiling above 538° C., while at the same time effecting high conversion into products boiling below 538° C., and showing low sediment formation.

Japanese Patent Laid-Open No. 1994-88081 discloses a hydroprocessing method for heavy hydrocarbon oils by using a catalyst with a specific pore size distribution. In this method a catalyst is used with 3 to 6 wt. % of a Group VIII metal oxide, 4.5 to 24 wt. % of a Group VIB metal oxide, and 0 to 6 wt. % of phosphorus oxides loaded onto a porous alumina carrier which has a specific surface area of 165 to 230 $m^2/g$, a total pore volume of 0.5 to 0.8 ml/g, and a pore size distribution wherein 5% or less of the total pore volume is present in pores with a diameter less than 80 Å, 65–70% of the total pore volume present in pores with a diameter below 250 Å is present in a range of 20 Å below the MPD to 20 Å above the MPD, and 22–29% of the total pore volume is present in pores with a diameter of more than 250 Å.

However, although this method can achieve efficient hydrodesulfurisation and Conradson carbon reduction, it does not solve the problem of sediment formation.

Japanese Patent Laid-Open No. 1994-200261 discloses a hydroprocessing method for heavy oils, and a catalyst used to implement this method. In this reference a catalyst was proposed with 2.2 to 6 wt. % of a Group VIII metal oxide and 7 to 24 wt. % of a Group VIB metal oxide on a porous alumina carrier, which catalyst has a surface area of 150–240 $m^2/g$, a total pore volume of 0.7 to 0.98 ml/g, and a pore size distribution wherein less than 20% of the total pore volume is present in pores with a diameter less than 100 Å, at least 34% of the total pore volume is present in pores with a diameter of 100–200 Å, and 26–46% of the total pore volume is present in pores with a diameter of more than 200 Å. However, this catalyst does not show a sufficient decrease in sediment formation.

Japanese patent publication 2-48485 describes a process for preparing an alumina catalyst carrier which has 0.6 to 0.85 ml/g of its pore volume in pores with a diameter below 500 Å and 0.1 to 0.3 ml/g of pore volume in pores with a diameter of 1000 to 10000 Å. The pore mode in the range up to 500 Å is 90–210 Å. The U-value, defined as D50/(D95-D5), is at least 0.55. The macropore volume of this carrier is very high, making it difficult to maintain stable hydrodesulfurization activity. Additionally, this reference gives no indication on how and in what form the alumina described therein can be applied in hydroprocessing.

U.S. Pat. No. 4,395,329 describes a hydroprocessing catalyst for heavy oils which has a specific pore size distribution. The catalysts described in this reference have 10–25% of pore volume present in pores with a diameter above 10000 Å. Especially when these catalysts are made by extrusion, this will detrimentally affect the strength of the catalyst and it is expected that it will be difficult to use the catalyst commercially.

U.S. Pat. No. 5,322,829 describes an ebullated bed catalyst which may comprise 0.1–5 wt. % of nickel, calculated as oxide, and 1–15 wt. % of molybdenum, calculated as oxide, wherein the catalyst has a surface area of at least 150 $m^2/g$ and a total pore volume of 0.8–1.4 ml. The carrier has at least 0.4 cc/g of pore volume in pores with a radius below 200 Å. However, it can be assumed that the catalyst based on the carrier described in this reference has less than 50% of its the total pore volume present in pores with a diameter of at least 200 Å. Therefore, the diffusion of ultraheavy fractions into the pores will be insufficient.

U.S. Pat. No. 4,414,141 is directed to a hydrotreating catalyst suitable for the hydrotreating of heavy feedstocks. The catalyst generally has a total pore volume 0.75–0.95 ml/g and a surface area generally is 150–300 $m^2/g$. It has 0.25–0.40 ml/g of pore volume in pores with a diameter below 250 Å, 0.1–0.25 ml/g of pore volume in pores with a diameter of 250–500 Å, 0.20–0.30 ml/g in pores with a diameter of 500–1500 Å, 0.05–0.15 ml/g in pores with a diameter of 1500–4000 Å, and 0.03–0.1 ml/g of pore volume in pores with a diameter above 400 Å. The catalyst is indicated to be suitable for HDS. No indication is given on the activity of the catalyst in metals removal or asphaltene removal.

Canadian patent No. 1248513 describes a HDS/HDM catalyst suitable for heavy hydrocarbon feeds. The catalyst has a total pore volume of at least 0.5 ml/g, a compacted density of at least 0.4 g/ml, a macropore volume of 0.035–0.075 ml per ml of catalyst volume, and a micropore volume of at least 70% of the nitrogen adsorption volume and at least 0.12 ml/ml of catalyst volume. The reference gives no information on asphaltene removal or sediment formation. Additionally, most of the catalysts in this reference have a very high pore volume. At a pore volume of more than 1.0 ml/g, catalyst strength is often insufficient.

SUMMARY OF THE INVENTION

In one embodiment, the present invention comprises a catalyst comprising 7–20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier. The catalyst has a specific surface area of 100–180 m$^2$/g, a total pore volume of at least 0.55 ml/g, at least 50% of the total pore volume in pores with a diameter of at least 20 nm (200 Å), 10–30% of the total pore volume in pores with a diameter of at least 200 nm (2000 Å), and 0–1% of the total pore volume in pores with a diameter above 1000 nm (10000 Å).

In a second embodiment, the present invention comprises a method for the hydroprocessing of heavy hydrocarbon feeds, wherein a feedstock of which at least 50 wt. % boils above 538° C. (1000° F.), and which comprise at least 2 wt. % of sulfur and at least 5 wt. % of Conradson carbon is contacted with the catalyst of the claim 1.

Other embodiments of the invention, that will be hereinafter discussed encompass details such as physical properties of the catalyst and composition of the feedstock to the hydroprocessing method of the invention.

DETAILED DESCRIPTION OF THE INVENTION

The object of the present invention is to provide a catalyst which is suitable for the hydroprocessing of a heavy hydrocarbon oil containing a large amount of impurities such as sulfur, Conradson carbon residue, metals, nitrogen, and/or asphaltenes, to obtain efficient removal of these compounds and the production of lighter material with only limited sediment formation. The catalyst should be specifically suitable for the hydroprocessing of hydrocarbon feeds of which at least 80 wt. % boils above 538° C. to effect at least conversion into lower boiling products and asphaltene removal in combination with low sediment formation. Obviously, it should also have sufficient strength to be operable in commercial hydroprocessing operations, in particular ebullating bed operations.

The inventors studied intensively to solve this problem, and found that a catalyst, as described above, meets specific requirements as to surface area, pore volume, pore size distribution, and metals composition solves this problem.

The catalyst according to the invention comprises catalytic materials on a porous carrier. The catalytic materials present on the catalyst according to the invention comprise a Group VIB metal and a Group VIII metal of the Periodic Table of Elements applied by Chemical Abstract Services (CAS system). The Group VIII metal used in this invention is at least one selected from nickel, cobalt, and iron. In view of their hydrogenation activity and price, cobalt and nickel are preferred. Nickel is especially preferred. As the Group VIB metals which can be used, molybdenum, tungsten, and chromium may be mentioned, but in view of performance and economy, molybdenum is preferred. The combination of molybdenum and nickel is particularly preferred for the catalytic materials of the catalyst according to the invention.

Based on the weight (100 wt. %) of the final catalyst, the amounts of the respective catalytic materials in the catalysts used in the process according to the invention are as follows.

The catalysts comprise 7–20 wt. %, preferably 8–16 wt. %, of Group VIB metal, calculated as trioxide. If less than 7 wt. % is used, the activity of the catalyst will be insufficient. On the other hand, if more than 16 wt. %, in particular more than 20 wt. % is used, the catalytic performance will not be improved further.

The catalysts comprise 0.5–6 wt. %, preferably 1–5 wt. %, of Group VIII metal, calculated as oxide. If the amount is less than 0.5 wt. %, the activity of the catalysts will be too low. If more than 6 wt. % is present, the catalyst performance will not be improved further.

The total pore volume of the catalyst of the invention is at least 0.55 ml/g, preferably at least 0.6 ml/g. It is preferred if it is at most 1.0 ml/g, more preferably at most 0.9 ml/g. If the pore volume is too low, the activity of the catalyst will be insufficient; if it is too high, the strength of the catalyst will be detrimentally affected. The determination of the total pore volume and the pore size distribution is effected via mercury penetration at a contact angle of 140° with a surface tension of 480 dynes/cm, using, for example, a mercury porosimeter Autopore II (trade name) produced by Micrometrics.

The catalyst of the invention has a specific surface area of 100–180 m$^2$/g, preferably at least 130 m$^2$/g and at most 170 m$^2$/g. If the surface area is less than 100 m$^2$/g, the catalytic activity will be too low. If the surface area of the catalyst is too high, sediment formation may increase. In the present specification the surface area is determined in accordance with the BET method based on N$_2$ adsorption.

The catalyst of the invention has at least 50% of the total pore volume in pores with a diameter of at least 20 nm (200 Å), preferably at least 60%. The percentage of pore volume in this range is preferably at most 80%. If the percentage of pore volume in this range is below 50%, the catalytic performance, especially the asphaltene cracking activity, will decrease. As a result thereof, sediment formation will increase.

The catalyst of the invention has 10–30% of the total pore volume in pores with a diameter of at least 200 nm (2000 Å), preferably 15–25%. If the percentage of pores in this range is too low, the asphaltene removal capacity decreases, therewith increasing sediment formation. If the percentage of pores in this range is too high, the mechanical strength of the catalyst will decrease, possibly to a value unacceptable for commercial operation.

The catalyst according to the invention has 0–1% of its total pore volume in pores with a diameter of more than 1000 nm (10000 Å). If this requirement is not met, the hydrogenation activity, the hydrodesulfurisation activity, and the residuum cracking rate decrease to an unacceptable level. Additionally it will be difficult for the catalyst to have adequate strength.

Especially when the feedstock contains a large amount of vacuum residue, that is, if the percentage of the feed boiling above 538° C. is at least 80%, it is preferred for the catalyst of the invention to have a % PV(10–120 nm) (% PV(100–1200 Å)) of less than 85%, preferably less than 82%, more preferably less than 80%. If the percentage of pore volume present in this range becomes too high, the percentage of pore volume in pores with a diameter above 200 nm (2000 Å) decreases, and the residue cracking rate may be insufficient.

It is preferred for the catalyst of the invention to have less than 0.2 ml/g of pore volume in pores with a diameter of 50–150 nm (500 to 1500 Å), more preferably less than 0.15 ml/g, still more preferably less than 0.10 ml/g. If more than 0.2 ml/g of pore volume is present in this range, the relative percentage of pore volume present in pores with a diameter below 30 nm (300 Å) will decrease, and the catalytic performance may decline. Additionally, since pores with a diameter below 30 nm (300 Å) are liable to closing by very heavy feedstock components, it is feared that the life of the catalyst may be shortened if the amount of pore volume present in this range is relatively too small.

Additionally, it is preferred for the catalyst of the invention to have less than 25% of its pore volume in pores with a diameter of 10 nm (100 Å) or less. If the percentage of pore volume present in this range is above this value, sediment formation may increase due to increased hydrogenation of the non-asphaltenic feed constituents.

The catalyst of the invention is based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 80% of alumina, more preferably at least 90%, still more preferably at least 95%, with the rest of the carrier being made up from one or more of silica, titania, zirconia, boria, zinc oxide, phosphorus, alkali metals, alkaline earth metals, zeolites and clays. If an additional component is present in an alumina carrier it is preferably selected from silica, boria, phosphorus, and/or alkaline metals. A carrier consisting essentially of alumina is preferred, the wording "consisting essentially of" being intended to mean that minor amounts of other components may be present, as long as they do not detrimentally affect the catalytic activity of the catalyst. More in particular, care should be taken with compounds which promote hydrogenation, like titania, since they will increase sediment formation. Therefore, it is preferred for the catalyst according to the invention to be substantially free from titania.

The catalyst particles can have the shapes and dimensions common to the art. Thus, the particles may be spherical, cylindrical, or polylobal and their diameter may range from 0.5 to 10 mm. Particles with a diameter of 0.5–3 mm, preferably 0.7–1.2 mm, for example 0.9–1 mm, and a length of 2–10 mm, for example 2.5–4.5 mm, are preferred. For use in fixed bed operation polylobal particles are preferred, because they lead to a reduced pressure drop in hydrodemetallisation operations. Cylindrical particles are preferred for use in ebullating bed operations.

The carrier to be used in the catalysts to be used in the process according to the invention can be prepared by processes known in the art. A typical production method for a carrier comprising alumina is coprecipitation of sodium aluminate and aluminum sulfate. The resulting gel is dried, extruded, and calcined, to obtain an alumina-containing carrier. Optionally, other components such as silica may be added before, during, or after precipitation. By way of example, a process for preparing an alumina gel will be described below. First, a tank containing tap water or warm water is charged with an alkali solution of sodium aluminate, aluminum hydroxide or sodium hydroxide, etc., and an acidic aluminum solution of aluminum sulfate or aluminum nitrate, etc. is added for mixing. The hydrogen ion concentration (pH) of the mixed solution changes with the progression of the reaction. It is preferable that when the addition of the acidic aluminum solution is completed, the pH is 7 to 9, and that during mixing, the temperature is 70 to 85° C., preferably 76–83° C. The mixture is then kept at that temperature for, in general, 0.5–1.5 hours, preferably for 40–80 minutes.

In a following stage, the gel is separated from the solution and a commercially used washing treatment, for example a washing treatment using tap water or hot water, is carried out to remove impurities, mainly salts, from the gel. Then, optionally after kneading to improve the moldability of the gel, the gel is shaped into particles in a manner known in the art, e.g., by way of extrusion, beading or pelletizing.

Finally, the shaped particles are dried and calcined. The drying is generally carried out at a temperature from room temperature up to 200° C., generally in the presence of air. The calcining is generally carried out at a temperature of 300 to 950° C., preferably 600 to 900° C., generally in the presence of air, for a period of 30 minutes to six hours. If so desired, the calcination may be carried out in the presence of steam to influence the crystal growth in the oxide.

By the above production method it is possible to obtain a carrier having properties which will give a catalyst with the surface area, pore volume, and pore size distribution characteristics specified above. The surface area, pore volume, and pore size distribution characteristics can be adjusted in a manner known to the skilled person, for example by the addition during the mixing or shaping stage of an acid, such as nitric acid, acetic acid or formic acid, or other compounds as moulding auxiliary, or by regulating the water content of the gel by adding or removing water.

The carrier of the catalyst according to the invention has a specific surface area, pore volume, and pore size distribution of the same order as those of the catalyst itself. The carrier preferably has a surface area of 100–180 m$^2$/g, more preferably 130–170 m$^2$/g. The total pore volume is preferably at least 0.55 ml/g, more preferably 0.6–0.9 ml/g.

he Group VIB metal components and Group VIII metal components can be incorporated into the catalyst carrier in a conventional manner, e.g., by impregnation and/or by incorporation into the support material before it is shaped into particles. At this point in time it is considered preferred to first prepare the carrier and incorporate the catalytic materials into the carrier after it has been dried and calcined. The metal components can be incorporated into the catalyst composition in the form of suitable precursors, preferably by impregnating the catalyst with an acidic or basic impregnation solution comprising suitable metal precursors.

For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. The impregnation solution, if applied, may contain other compounds the use of which is known in the art, such as organic acids, e.g., citric acid, ammonia water, hydrogen peroxide water, gluconic acid, tartaric acid, malic acid or EDTA (ethylenediamine tetraacetic acid). It will be clear to the skilled person that there is a wide range of variations on this method. Thus, it is possible to apply a plurality of impregnating stages, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the metals have been incorporated into the catalyst composition, it is optionally dried, e.g., in air flow for about 0.5 to 16 hours at a temperature between room temperature and 200° C., and subsequently calcined, generally in air, for about 1 to 6 hours, preferably 1–3 hours at 200–800° C., preferably 450–600° C. The drying is done to physically remove the deposited water. The calcining is done to bring at least part, preferably all, of the metal component precursors to the oxide form.

It may be desirable to convert the catalyst, i.e., the Group VIB and Group VIII metal components present therein, into the sulfidic form prior to its use in the hydroprocessing of hydrocarbon feedstocks. This can be done in an otherwise conventional manner, e.g., by contacting the catalyst in the reactor at increasing temperature with hydrogen and a sulfur-containing feedstock, or with a mixture of hydrogen and hydrogen sulfide. Ex situ presulfiding is also possible.

The catalyst of the present invention is particularly suitable for the hydroprocessing of heavy hydrocarbon feeds. It is particularly suitable for hydroprocessing heavy feedstocks of which at least 50 wt. % boils above 538° C. (1000° F.), and which comprise at least 2 wt. % of sulfur and at least 5 wt. % of Conradson carbon. The advantages of the catalyst according to the invention are particularly apparent for feedstocks of which at least 80 wt. %, boils above 538° C. (1000° F.), which preferably have a sulfur content of above 3 wt. % and/or a Conradson carbon content above 8 wt. %, more preferably above 10 wt. %. The feedstock may contain contaminant metals, such as nickel and vanadium. Typically, these metals are present in an amount of at least 20 wtppm, calculated on the total of Ni and V, more particularly in an amount of at least 30 wtppm.

Suitable feedstocks include atmospheric residue, vacuum residue, residues blended with gas oils, particularly vacuum gas oils, crudes, shale oils, tar sand oils, solvent deasphalted oil, coal liquefied oil, etc. Typically they are atmospheric residue (AR), vacuum residue (VR), and mixtures thereof.

The process can be carried out in a fixed bed, in a moving bed, or in an ebullated bed. The catalyst is particularly suitable for use in ebullating bed operations.

The process conditions for the process according to the invention may be as follows. The temperature generally is 350–450° C., preferably 400–440° C. The pressure generally is 5–25 MPA, preferably 14–19 MPA. The liquid hourly space velocity generally is 0.1–3 h-1, preferably 0.3–2 h-1. The hydrogen to feed ratio generally is 300–1500 Nl/l, preferably 600–1000 Nl/l. The process is carried out in the liquid phase.

The catalyst according to the invention can be used alone in the hydroprocessing of heavy hydrocarbon feeds or in combination with commercially available heavy-feed hydroprocessing catalysts which do not meet the above requirements. In the latter case, it is preferred for the commercial catalyst to be present in an amount of less than 50 vol. %.

The invention will be elucidated below by way of the following examples, though it must not be deemed limited thereto or thereby.

EXAMPLE 1

Preparation of Catalyst A According to the Invention

A sodium aluminate solution and an aluminum sulfate solution were simultaneously added dropwise to a tank containing tap water, mixed at pH 8.5 at 80° C., and held for 70 minutes. The thus produced alumina hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were dried at 120° C. for 16 hours and calcined at 800° C. for 2 hours, to obtain an alumina carrier.

00 g of the alumina carrier obtained as described above were immersed in 100 ml of a citric acid solution containing 17.5 g of ammonium molybdate tetrahydrate and 9.8 g of nickel nitrate hexahydrate at 25° C. for 45 minutes, to obtain a carrier loaded with metallic components.

Subsequently the loaded carrier was dried at 120° C. for 30 minutes and calcined at 620° C. for 1.5 hours, to complete a catalyst. The amounts of the respective components in the produced catalyst and the properties of the catalyst are shown in Table 1.

Preparation of Catalyst B According to the Invention

A carrier was prepared as described for Catalyst A above, except that the temperature during carrier preparation was 77° C.

100 g of the thus obtained alumina carrier were immersed in 100 ml of a citric acid solution containing 17.3 g of ammonium molybdate tetrahydrate and 9.6 g of nickel nitrate hexahydrate at 25° C. for 45 minutes, to obtain a carrier loaded with metallic components.

The loaded carrier was dried and calcined as for Catalyst A described above. The amounts of the respective components in the produced catalyst and the properties of the catalyst are shown in Table 1.

Preparation of Comparative Catalyst 1

An alumina gel was prepared as described for Catalyst A above. A sodium silicate solution was mixed through the gel to produce a concentration in the alumina gel aqueous solution of 1.62 wt. %. The mixture was then washed, extruded, shaped and calcined as described for Catalyst A above to obtain a carrier comprising 7 wt. % of silica.

100 g of the thus obtained alumina carrier were immersed in 100 ml of a citric acid solution containing 16.4 g of ammonium molybdate tetrahydrate and 9.8 g of nickel nitrate hexahydrate at 25° C. for 45 minutes, to obtain a carrier loaded with metallic components.

The loaded carrier was dried and calcined as for Catalyst A described above, except that the calcination temperature was 600° C. The amounts of the respective components in the produced catalyst and the properties of the catalyst are shown in Table 1.

Preparation of Comparative Catalyst 2

A sodium aluminate solution and an aluminum sulfate solution were simultaneously added dropwise to a tank containing tap water, mixed at pH 7.5 at 77° C. Sodium aluminate was then added until a final pH of 9.5 was reached, when the mixture was held for 70 minutes. The thus produced alumina hydrate gel was converted into a carrier in the same way as described for the carrier of Catalyst A. The carrier was converted into a catalyst as described for Catalyst A, except that the impregnation solution contained 17.2 g ammonium molybdate tetrahydrate and that the calcination temperature was 600° C. The composition and properties of Comparative Catalyst 2 are given in Table 1.

Preparation of Comparative Catalyst 3

Aluminum sulfate was supplied to a tank containing tap water, and an aluminum sulfate solution and a sodium silicate solution were simultaneously added dropwise at pH 7.8 and mixed. The temperature during mixing was 65° C. The mixture was kept at that temperature for 70 minutes. The gel was converted into a carrier in the manner described above for Comparative Catalyst 1.

One hundred grams of the thus obtained alumina carrier were impregnated with 100 ml of an impregnation solution containing 17.2 g of ammonium molybdate tetrahydrate, 9.8 g of nickel nitrate hexahydrate, and 50 ml of 25% ammonia water at 25° C. for 45 minutes. The impregnated carrier was then dried at a temperature of 120° C. for 30 minutes and calcined in a kiln for 1.5 hours at 600° C. to produce a final catalyst. The composition and properties of this catalyst are given in Table 1.

Preparation of Comparative Catalyst 4

A large-pore carrier was prepared by grinding some of the calcined carrier material of Comparative Catalyst 2, mixing it with alumina gel prepared as described for Comparative Catalyst 2, and converting the mixture into a carrier as described for Catalyst A.

100 g of the thus obtained alumina carrier were immersed in 100 ml of a citric acid solution containing 17.2 g of ammonium molybdate tetrahydrate and 9.5 g of nickel nitrate hexahydrate at 25° C. for 45 minutes, and dried and calcined as described for Comparative Catalyst 1. The amounts of the respective components in the produced catalyst and the properties of the catalyst are shown in Table 1.

Preparation of Comparative Catalyst 5

Aluminum sulfate was added to a tank containing tap water, and a sodium aluminate solution and an aluminum sulfate solution were simultaneously added dropwise to a tank containing tap water, mixed at pH 8.5 at 65° C., and held for 70 minutes. The thus produced alumina hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were dried at 120° C. for 16 hours and calcined at 900° C. for 2 hours, to obtain an alumina carrier.

100 g of the alumina carrier obtained as described above were immersed in 100 ml of a citric acid solution containing 16.4 g of ammonium molybdate tetrahydrate and 9.8 g of nickel nitrate hexahydrate at 25° C. for 45 minutes, to obtain a carrier loaded with metallic components.

Subsequently the loaded carrier was dried at 120° C. for 30 minutes and calcined at 600° C. for 1.5 hours, to complete a catalyst. The amounts of the respective components in the produced catalyst and the properties of the catalyst are shown in Table 1.

TABLE 1

Catalyst composition and properties

| | Catalyst A | Catalyst B | Comparative Catalyst 1 | Comparative Catalyst 2 |
|---|---|---|---|---|
| carrier | alumina | alumina | $Al_2O_3$ + 5% $SiO_2$ | alumina |
| Group VIB wt. % ox | 13.1 | 13.1 | 11.4 | 13.3 |
| Group VIII wt. % ox | 2.0 | 2.0 | 2.1 | 2.1 |
| surface area $m^2/g$ | 161 | 163 | 195 | 168 |
| total pore volume ml/g | 0.88 | 0.87 | 0.76 | 0.72 |
| % PV(>200 Å) | 63 | 63 | 38 | 35 |
| % PV(>2000 Å) | 24 | 13 | 14 | 12 |
| % PV(>10000 Å) | 0.1 | 0 | 0 | 0.5 |
| % PV(<100 Å) | 0.4 | 0.4 | 14 | 0.4 |

| | Comparative Catalyst 3 | Comparative Catalyst 4 | Comparative Catalyst 5 |
|---|---|---|---|
| carrier | alumina | alumina | alumina |
| Group VIB wt. % ox | 13.3 | 13.0 | 11.9 |
| Group VIII wt. % ox | 2.1 | 2.2 | 2.0 |
| surface area $m^2/g$ | 162 | 125 | 147 |
| total pore volume ml/g | 0.77 | 0.80 | 0.79 |
| % PV(>200 Å) | 46 | 70 | 74 |
| % PV(>2000 Å) | 19 | 35 | 1 |
| % PV(>10000 Å) | 0 | 3.5 | 0 |
| % PV(<100 Å) | 0.4 | 0.6 | 0.4 |

Hydroprocessing of 50:50 VR/AR Feed

Various of the above-mentioned catalysts were tested in the hydroprocessing of a heavy hydrocarbon feedstock. The feedstock used in these examples was a Middle East (Kuwait) petroleum consisting of 50 wt. % of vacuum residue (VR) and 50 wt. % of atmospheric residue (AR). The composition and properties of the feed are given in Table 2.

TABLE 2

Feedstock composition
Middle East petroleum (VR:AR = 50:50)

| Sulfur (wt. %) | 4.79 |
|---|---|
| Nitrogen (wppm) | 2890 |
| Metals—vanadium (wppm) | 85 |
| Metals—nickel (wppm) | 26 |
| Conradson Carbon residue (wt. %) | 16.2 |
| C7-insolubles[1] (wt. %) | 6.0 |
| Vacuum residue[2] (wt. %) | 75 |
| Density (g/ml at 15° C.) | 1.0048 |

[1]Asphaltene fraction - Matter insoluble in n-heptane
[2]Fraction boiling above 538° C. in accordance with ASTM D 5307 (distillation gas chromatography)

The feedstock was introduced in the liquid phase into a fixed bed unit packed with the catalyst to be tested, at a liquid hourly space velocity of 1.5 h-1, a pressure of 16.0 MPa, an average temperature of 427° C., with the ratio of supplied hydrogen to feedstock ($H_2$/oil) being kept at 800 Nl/l.

The oil product produced by this process was collected and analysed to calculate the amounts of sulfur (S), metals (vanadium+nickel) (M), and asphaltene (Asp) removed by the process, as well as the 538° C.+fraction. The relative volume activity values were obtained from the following formulae.

$$RVA = 100 * k(\text{tested catalyst})/k(\text{comparative catalyst 1})$$

wherein for HDS $$k=(LHSV/(0.7))*(1/y^{0.7}-1/x^{0.7})$$

and for HDM and asphaltene removal $$k=LHSV*ln(x/y)$$

with x being the content of S, M, or Asp in the feedstock, and y being the content of S, M, or Asp in the product.

Table 3 below gives the tested catalysts and the results obtained.

TABLE 3

| | Catalyst | | | | | |
|---|---|---|---|---|---|---|
| | A | B | 1 | 2 | 3 | 4 |
| RVA HDS | 85 | 90 | 100 | 98 | 90 | 56 |
| RVA HDM | 120 | 116 | 100 | 95 | 90 | 101 |
| RVA Asp | 118 | 115 | 100 | 110 | 102 | 95 |
| Cracking rate 538° C. + fraction (residue) (wt. %) | 37 | 38 | 41 | 41 | 40 | 37 |
| Sediment[1] (wt. %) | 0.07 | 0.08 | 0.29 | 0.28 | 0.25 | 0.20 |

[1]Sediment determined in accordance with the IP 375 method of the English Institute of Petroleum As can be seen from Table 3, the catalysts according to the invention show high activities in HDS, HDM, and asphaltene removal in combination with a high residue cracking rate and low sediment formation as compared with the comparative catalysts.

Hydroprocessing of 90:10 VR/AR Feed

Various of the above-mentioned catalysts were tested in the hydroprocessing of a very heavy hydrocarbon feedstock. The feedstock used in these examples was a Middle East (Kuwait) petroleum consisting of 90 wt. % of vacuum residue (VR) and 10 wt. % of atmospheric residue (AR). The composition and properties of the feed are given in Table 4.

TABLE 4

| Feedstock composition Middle East petroleum (VR:AR = 90:10) | |
|---|---|
| Sulfur (wt. %) | 3.892 |
| Nitrogen (wppm) | 3300 |
| Metals - vanadium (wppm) | 109 |
| Metals - nickel (wppm) | 46 |
| Conradson Carbon residue (wt. %) | 22.5 |
| C7-insolubles[1] (wt. %) | 8.0 |
| Vacuum residue[2] (wt. %) | 90 |
| Density (g/ml at 15° C.) | 1.0298 |

[1]Asphaltene fraction - matter insoluble in n-heptane
[2]Fraction boiling above 538° C. in accordance with ASTM D 5307 (distillation gas chromatography)

The feedstock was introduced in the liquid phase into a fixed bed unit packed with the catalyst to be tested, at a liquid hourly space velocity of 1.5 h-1, a pressure of 16.0 MPa, an average temperature of 427° C., with the ratio of supplied hydrogen to feedstock ($H_2$/oil) being kept at 800 Nl/l.

The oil product produced by this process was collected and analysed to calculate the amounts of sulfur (S), metals (vanadium+nickel) (M), and asphaltene (Asp) removed by the process, as well as the 538° C.+fraction. Table 5 below gives the tested catalysts and the results obtained. Comparative Catalyst 5 is set as standard.

TABLE 5

| | Catalyst | | |
|---|---|---|---|
| | A | B | 5 |
| RVA HDS | 102 | 105 | 100 |
| RVA HDM | 115 | 117 | 100 |
| RVA Asp | 118 | 116 | 100 |
| Cracking rate 538° C. + fraction (residue) (wt. %) | 38 | 39 | 40 |
| Sediment[1] (wt. %) | 0.09 | 0.08 | 0.26 |

As can be seen from Table 5, the catalysts according to the invention show high activities in HDS, HDM, and asphaltene removal in combination with a high residue cracking rate and low sediment formation as compared with comparative catalyst 5.

The invention claimed is:

1. A catalyst comprising 7–20 wt. % of a Group VIB metal component, calculated as trioxide based on the weight of the catalyst, and 0.5 to 6 wt. % of a Group VIII metal component, calculated as oxide based on the weight of the catalyst, on a porous inorganic carrier, said catalyst having a specific surface area of 100–180 m$^2$/g, a total pore volume of at least 0.55 ml/g, at least 50% of the total pore volume in pores with a diameter of at least 20 nm (200 Å), 10–30% of the total pore volume in pores with a diameter of at least 200 nm (2000 Å), and 0–1% of the total pore volume in pores with a diameter above 1000 nm (10000 Å).

2. The catalyst of claim 1 which has a total pore volume of 0.6–1.0 ml/g.

3. The catalyst of claim 1 which has 60–80% of the total pore volume present in pores with a diameter above 20 nm (200 Å).

4. The catalyst of claim 1 further comprising 85% of its pore volume present in pores with a diameter of 10–120 nm (100–1200 Å).

5. The catalyst of claim 1 which has less than 0.2 ml/g of pore volume in pores with a diameter of 50–120 nm (500 to 1500 Å).

6. The catalyst of claim 1 which has a carrier consisting essentially of alumina.

7. A method for the hydroprocessing of heavy hydrocarbon feeds comprising contacting a feedstock with the catalyst of claim 1, wherein the feedstock of which at least 50 wt. % boils above 538° C. (1000° F.), and comprises at least 2 wt. % of sulfur and at least 5 wt. % of Conradson carbon.

8. The method of claim 7 wherein at least 80 wt. % of the feedstock boils above 538° C. (1000° F.) and wherein the feed has a sulfur content of above 3 wt. % and a Conradson carbon content above 8 wt. %.

9. The method of any of claim 7 wherein the catalyst is in the form of an ebullating bed.

* * * * *